United States Patent
Hasegawa (10) Patent No.: US 6,735,304 B2
(45) Date of Patent: May 11, 2004

(54) ADAPTIVE FILTER AND ECHO CANCELLER USING THE SAME

(75) Inventor: Atsushi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 493 days.

(21) Appl. No.: 09/796,448

(22) Filed: Mar. 2, 2001

(65) Prior Publication Data
US 2001/0024499 A1 Sep. 27, 2001

(30) Foreign Application Priority Data
Mar. 3, 2000 (JP) ........................................ 2000-059236

(51) Int. Cl.[7] ................................................ H04M 9/08
(52) U.S. Cl. ........................... 379/406.08; 379/406.01; 379/406.05; 379/406.14; 381/66; 381/71.11; 708/322; 708/323
(58) Field of Search ....................... 379/406.01, 406.05, 379/406.06, 406.08, 406.12, 406.14; 381/66, 71.11; 708/322, 323

(56) References Cited

U.S. PATENT DOCUMENTS 5,455,819 A    10/1995   Sugiyama
5,657,349 A  * 8/1997   Sugiyama .................... 375/232
5,859,914 A  * 1/1999   Ono et al. ...................... 381/66
5,966,438 A  * 10/1999  Romesburg ............ 379/388.03

FOREIGN PATENT DOCUMENTS

JP         7-202766        8/1995

* cited by examiner

Primary Examiner—Binh Tieu
Assistant Examiner—Tuan A Pham
(74) Attorney, Agent, or Firm—Foley & Lardner (57) ABSTRACT

An adaptive filter allowing rapid adaptation to a sudden and great change in a system to be estimated is disclosed A memory stores position information indicative of a signal block connected to each of M filter circuits and power information obtained from K filter coefficients generated by each of the M filter circuits. A valid/invalid block selector selects one as an invalid block from the M signal blocks connected to the M filter circuits and determines position information indicative of a selected signal block as an invalid block and a corresponding filter circuit that has been connected to the selected signal block. The position information indicative of the selected signal block is appended to a queue of a shift register and position information is output from a head of the queue. Based on the corresponding filter circuit and the position information received from the shift register, a matrix switch connecting M filter circuits and M signal blocks is controlled.

15 Claims, 7 Drawing Sheets

ADAPTIVE FILTER AND ECHO CANCELLER USING THE SAME

BACKGROUND OF THE INVENTION

1. Field of the Invention

The present invention relates to a circuit using an adaptive filter to estimate an unknown system, and in particular to an adaptive filter suitable for an echo canceller that cancels an echo that may be a problem in the case of long-distance lines having relatively long transmission delay and including devices that couple local two-wire to long-distance four-wire lines.

2. Description of the Related Art

System identification using an adaptive filter is performed by updating the coefficients wi(t) of the adaptive filter to estimate an output signal y(t) corresponding to an input signal x(t) of the system by using a difference e(t)=ŷ(t)−y(t), where ŷ(t) is an output of the active filter.

Taking a learning identification method or normalized LMS (least-mean square) method as an example of system identification method, a conventional echo cancellation method will be described hereafter. Here, it is assumed that an unknown system is an unknown echo path in the case where an echo is created when four-wire lines are converted to two-wire lines. The learning identification method has been described in "Adaptive Filter Theory" by Simon Haykin (Prentice-Hall Information and System Sciences series, 1996).

Consider an adaptive FIR (Finite Impulse Response) filter with N taps, a pseudo echo or echo replica ŷ(t) that is an output of the filter at time instant t is represented by $$\hat{y}(t) = \sum_{i=1}^{N} (wi(t) * x(t-i)), \quad (1)$$

where wi(t) is a i-th filter coefficient at time instant t and x(t) is a reference signal at time instant t.

Echo cancellation is achieved by subtracting the pseudo echo ŷ(t) from an echo signal y(t) as follows:

$$e(t)=y(t)-\hat{y}(t) \quad (2),$$

where e(t) is a residual signal.

The filter coefficient wi(t) is updated so as to minimize the residual signal e(t) as follows:

$$wi(t+1)=wi(t)-\mu(t)e(t)x(t-i) \quad (3) \text{ and}$$

$$\mu(t)=\mu 0/PX(t) \quad (4),$$

where $\mu(t)$ is a step size and $\mu 0$ is a positive constant that has an effect on convergence rate and PX(t) is power of a reference signal x(t). The power PX(t) Is represented by $$PX(t) = \sum_{i=1}^{N} x(t-i)^2. \quad (5)$$

As is apparent from the above-described equations (1) through (5), generation of pseudo echo, power calculation of reference signal, and update of filter coefficient need the increasing amount of computation and memory in proportion to N. Further, It is known that the convergence rate of LMS-base algorithm such as the learning identification method is inversely proportional to N (see "Adaptive Filter Theory" by Simon Haykin, pp365–444, Prentice-Hall Information and System Sciences series, 1996).

Figure 7:
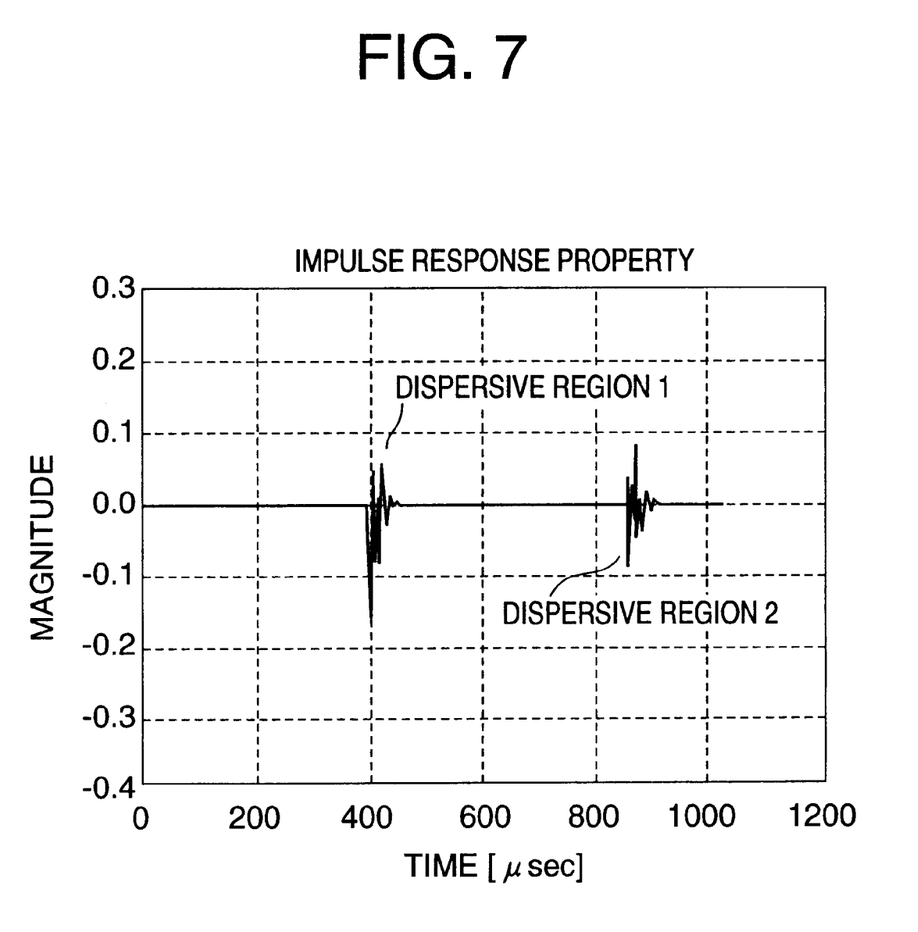
FIG. 7 is a graph showing an example of impulse response property.

On the other hand, a dispersive region in impulse response of an echo path is only a part of the impulse response region (see FIG. 7). To eliminate an echo, it is necessary to estimate such a dispersive region by adjusting N tap filter coefficients of the adaptive filter. However, it is usually unknown when a dispersive region appears and therefore N is determined on the assumption of longest time interval. Since a dispersive region is only a part of the impulse response region, the filter coefficients provide a fixed delay section and a convergence section where coefficients after the dispersive region converge to zero. For the filter coefficients converging to zero, it is not necessary to calculate the equations (1) and (3). Therefore, these steps can be omitted. In other words, waste can be eliminated by dividing the N taps into valid taps to be subjected to the filter calculation and invalid taps not to be subjected to the filter calculation.

There has been disclosed a system estimator having a matrix switch connected between a series of delay elements and a series of coefficient circuits in Japanese Patent Application Unexamined Publication No. 4-245810. The matrix switch is controlled such that the respective positions of the taps are exchanged to intensively allocate valid taps to the dispersive region, resulting in increased convergence rate and reduced memory.

As an improved one, there has been disclosed a system estimator having a matrix switch connected between blocked delay elements and blocked filter circuits in Japanese Patent Application Unexamined Publication No. 10-229324. Hereafter, the blocked structure and operation of this conventional system estimator will be described with reference to FIGS. 1 and 2.

Figure 1:
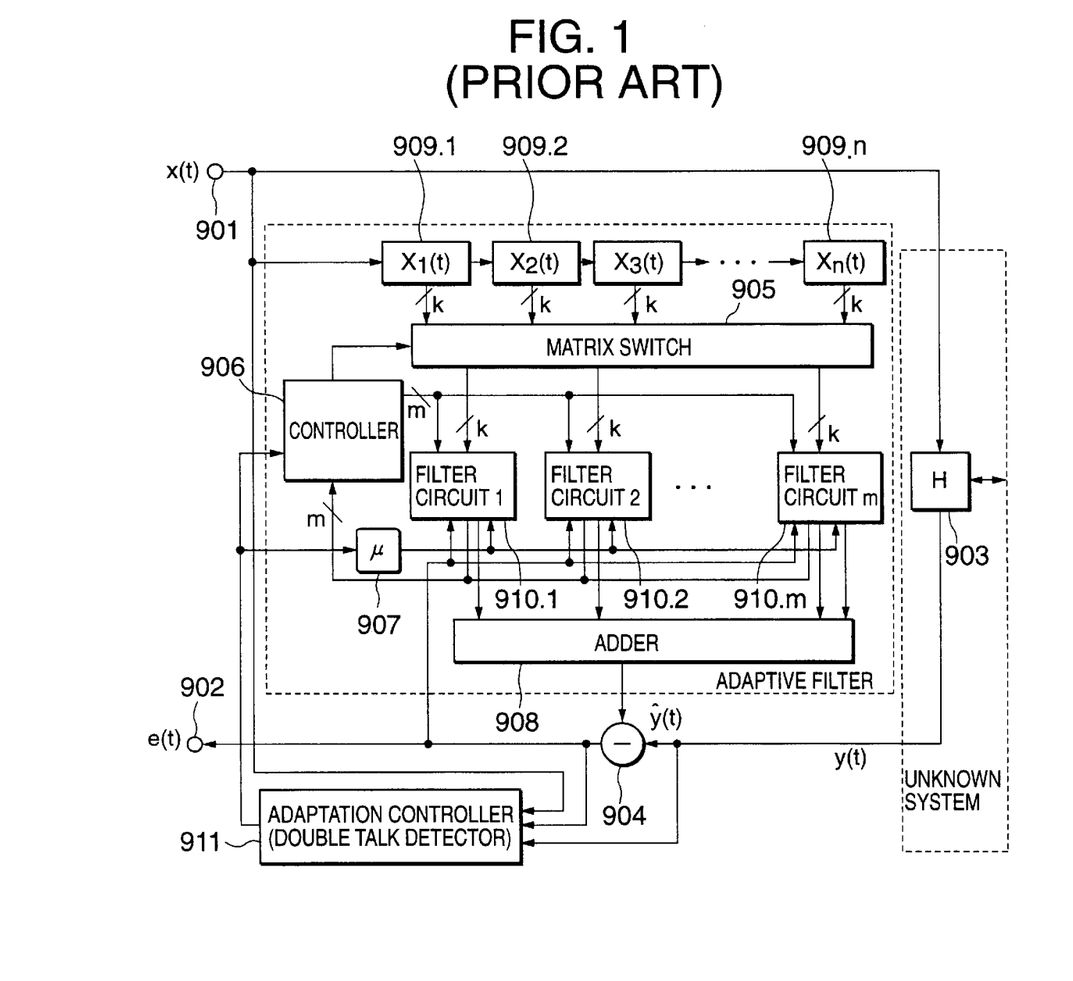
FIG. 1 is a block diagram showing the functional configuration of a conventional adaptive filter.

Referring to FIG. 1, echo cancellation is achieved by a subtracter 904 subtracting a pseudo echo ŷ(t) that is an output of an adaptive filter from an echo signal y(t), that is, e(t) =y(t)−ŷ(t), as described before. An adaptation controller 911 updates the filter coefficients of the adaptive filter so as to minimize the residual signal e(t).

The adaptive filter is provided with n input signal blocks 909.1 through 909.n, m filter circuits 910.1 through 910.m, a matrix switch 905 that connects the n input signal blocks 909.1 through 909.n to the n filter circuits 910.1–910.m under control of a controller 906. An input signal x(t) Is divided into the n input signal blocks 909.1 through 909.n, each block including k input signals. Each of the m filter circuits 910.1–910.m inputs k signals through the matrix switch 905 and generates k filter coefficients corresponding to respective ones of the k signals.

The controller 906 monitors m blocks of filter coefficients to control the matrix switch 905 so as to select m blocks from n blocks and connect the selected blocks to respective ones of the m filter circuits.

Hereinafter, an input signal block that is connected to an appropriate one of the filter circuits 910.1 through 910.m by the matrix switch 905 is called "valid block". On the other hand, an input signal block that is not connected to any of the filter circuits by the matrix switch 905 is called "invalid block". Such a switching operation of valid and invalid blocks, that is, selection operation of taps, is performed by the controller 906 as follows:

Selection 1: selecting one of the valid blocks that Is to switch from valid to invalid: and Selection 2: selecting one of the invalid blocks that is to switch from invalid to valid.

Figure 2:
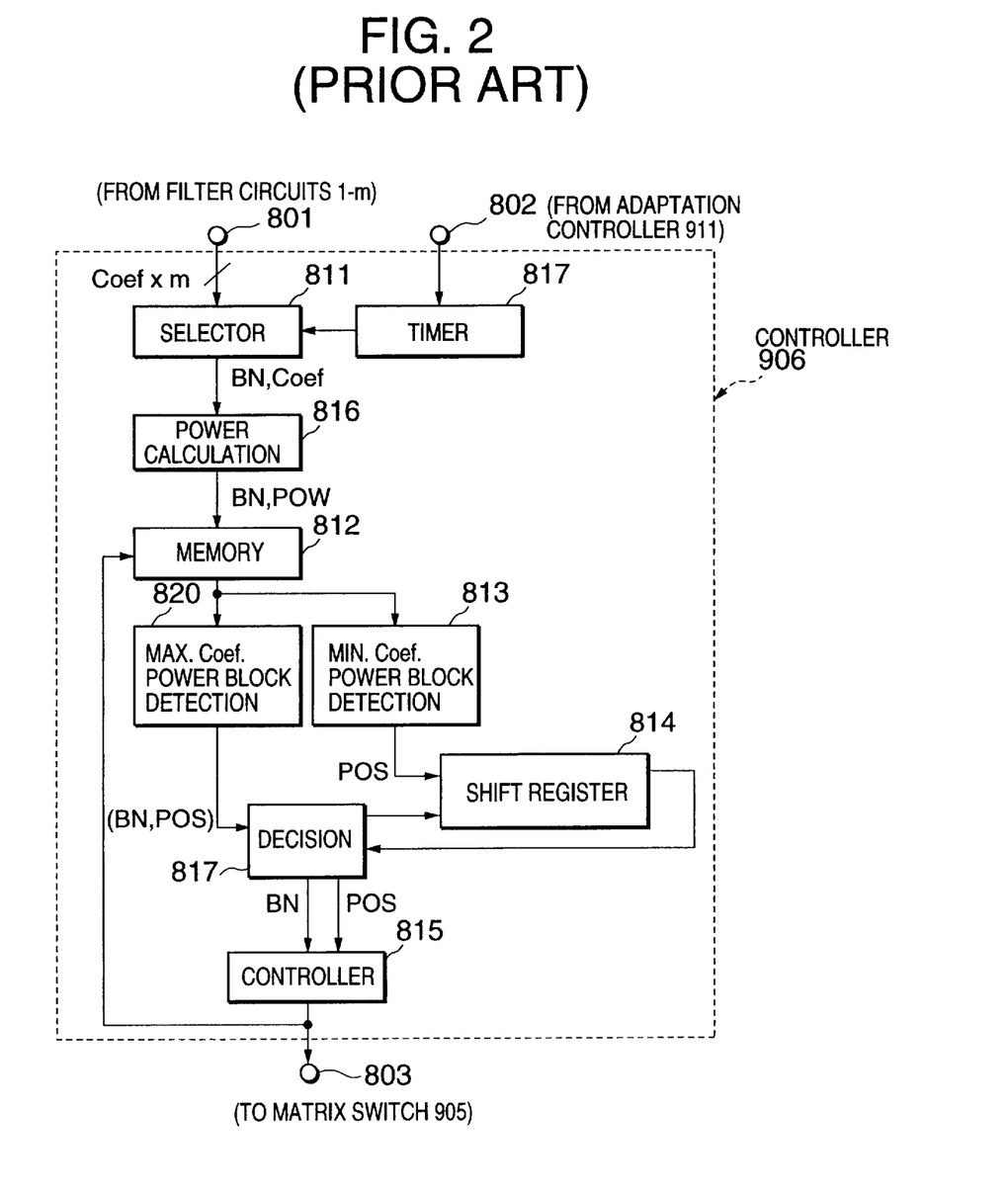
FIG. 2 is a block diagram showing the functional configuration of a controller in the conventional adaptive filter of FIG. 1.

FIG. 2 shows the functional configuration of the controller 906 for performing the above selection operation: Selection 1 and Selection 2.

In the processing of Selection 1, a minimum coefficient power block detector 813 detects the filter number BN and the position information POS of a block connected to the filter circuit providing the minimum coefficient power. The detected position information POS is stored in a shift register (or FIFO) 814 to append it to a queue stored in the shift register 814, In the processing of Selection 2, a maximum coefficient power block detector 820 detects the filter number BN and the position information POS of a block connected to the filter circuit providing the maximum coefficient power. The decision section 817 inputs the position information of a candidate from the shift register 814 and the position information corresponding to the filter circuit providing the maximum coefficient power from the maximum coefficient power block detector 820 and determines whether the candidate should switch from invalid to valid. For example, the determination is made depending on whether a difference between the position of the candidate and the position of the filter circuit providing the maximum coefficient power is smaller than a predetermined value (L). When it is determined that the candidate should switch from invalid to valid, the decision section 817 outputs the block number BN and the position information POS to a controller 815 to control the matrix switch 905. Contrarily, when it is determined that the candidate should not switch from invalid to valid, the decision section 817 outputs the position information to the shift register 814 to append it to a queue stored therein. In this manner, it is possible to allocate valid taps intensively to around taps providing the maximum power, resulting in increased convergence rate and high-speed estimation.

However, as shown in FIG. 2, a closed loop is formed between the shift register 814 and the decision section 817 such that the decision section 817 determines whether the candidate should switch from invalid to valid and, if the candidate should not switch from invalid to valid, then the decision section 817 outputs the position information to the shift register 814 to append it to a queue stored therein. Such a closed loop including the decision step makes the adaptive filter difficult to follow an irregular or sudden change of the unknown system, resulting in unstable estimation. For example, in the case where a dispersive region is dramatically changed from a position 1 to a position 2 as shown in FIG. 7, which may be caused by replacing the to-be-estimated system with another system, the adaptive filter fails to adapt to such a change.

In addition, according to the prior art, estimation of dispersive region is independently performed at the initial stage (see "A fast convergence algorithm for adaptive FIR filters with coarsely located taps" by Seiji Ikeda, pp. 1525–1529, Proc. ICASSP'91, 1991). In other words, the conventional adaptive filer is designed without taking a great system change during operation into consideration. In this case, the above-described decision step would adversely influence the system estimation. For example, the convergence rate is greatly decreased.

Further, since the processing of Selection 1 is performed by detecting a block of taps providing the minimum coefficient power, there are cases where a block of taps to be valid is selected as an invalid one when the power of the block is small. Concretely, in the case where a strongly correlative signal such as a voice signal is used to estimate, the filter coefficients are more unstable than in the case where the white noise having no correlation is used to estimate. Therefore, a block of taps to be valid may be erroneously determined to be invalid and is appended to the queue of the shift register 814. This results in reduced convergence rate.

Furthermore, according to the prior art, it is difficult to estimate a system exhibiting a plurality of dispersive regions because it is unknown when a plurality of dispersive regions occur. It is not possible for a single maximum coefficient power block detector 820 to cope with a plurality of dispersive regions. To estimate a plurality of dispersive regions, a plurality of maximum coefficient power block detectors 820 are needed.

SUMMARY OF THE INVENTION

An object of the present invention is to provide an adaptive filter allowing rapid adaptation to a sudden and great change in a system to be estimated.

Another object of the present invention is to provide an adaptive filter ensuring stable and rapid convergence even in the case of strongly correlative signal such as voice signal.

Still another object of the present invention is to provide an adaptive filter allowing rapid adaptation to a change in a system to be estimated without the need of specific processing at the initial stage of estimation.

According to the present invention, an adaptive filter includes: N signal blocks obtained by dividing a serial input signal by K, wherein N, K is an integer greater than 1; M (M <N) filter circuits, each of which generates K filter coefficients for one of the N signal blocks a switch for connecting M signal blocks selected from the N signal blocks to respective ones of the M filter circuits; and a controller controlling interconnection of the switch based on the K filter coefficients generated by each of the M filter circuits. The controller includes: a memory for storing position information indicative of a signal block connected to each of the M filter circuits, power information obtained from the K filter coefficients generated by each of the M filter circuits; a selector for selecting one as an invalid block from the M signal blocks connected to the M filter circuits to determine position information indicative of a selected signal block as an invalid block and a corresponding filter circuit that has been connected to the selected signal block; a shift register for storing a queue of position information, wherein the position information indicative of the selected signal block is appended to the queue and position information Is output from a head of the queue; and a switch controller controlling the switch using the corresponding filter circuit determined by the selector and the position information received from the shift register.

The selector may select one as an invalid block from the M signal blocks connected to the M filter circuits position by selecting a plurality of first signal blocks having relatively great power and a plurality of second signal blocks having relatively small power, wherein one of the second signal blocks, which is most distant from the first signal blocks, is selected as the invalid block.

The selector may include: a power sorter for sorting position information currently corresponding to respective ones of the M filter circuits in order of descending power information; a position comparator for comparing position information of the first signal blocks having higher-order power with that of each of the second signal blocks having lower-order power to produce minimum position differences for respective ones of the second signal blocks; and a maximum selector for selecting a maximum one of the minimum position differences to determine the position information indicative of a selected signal block as an invalid block and a corresponding filter circuit that has been connected to the selected signal block.

The position comparator may include: a position subtracter provided for position information of each of the first signal blocks, for calculating a position difference between a corresponding first signal block and a corresponding second signal block; and a minimum selector for selecting a minimum position difference from absolute values of position differences calculated for respective ones of the first signal blocks.

The position comparator may include: a position subtracter provided for position information of each of the first signal blocks, for calculating a position difference between a corresponding first signal block and a corresponding second signal block; and a positive minimum selector for selecting a minimum position difference from positive ones of position differences calculated for respective ones of the first signal blocks.

DESCRIPTION OF THE PREFERRED EMBODIMENT

Figure 3:
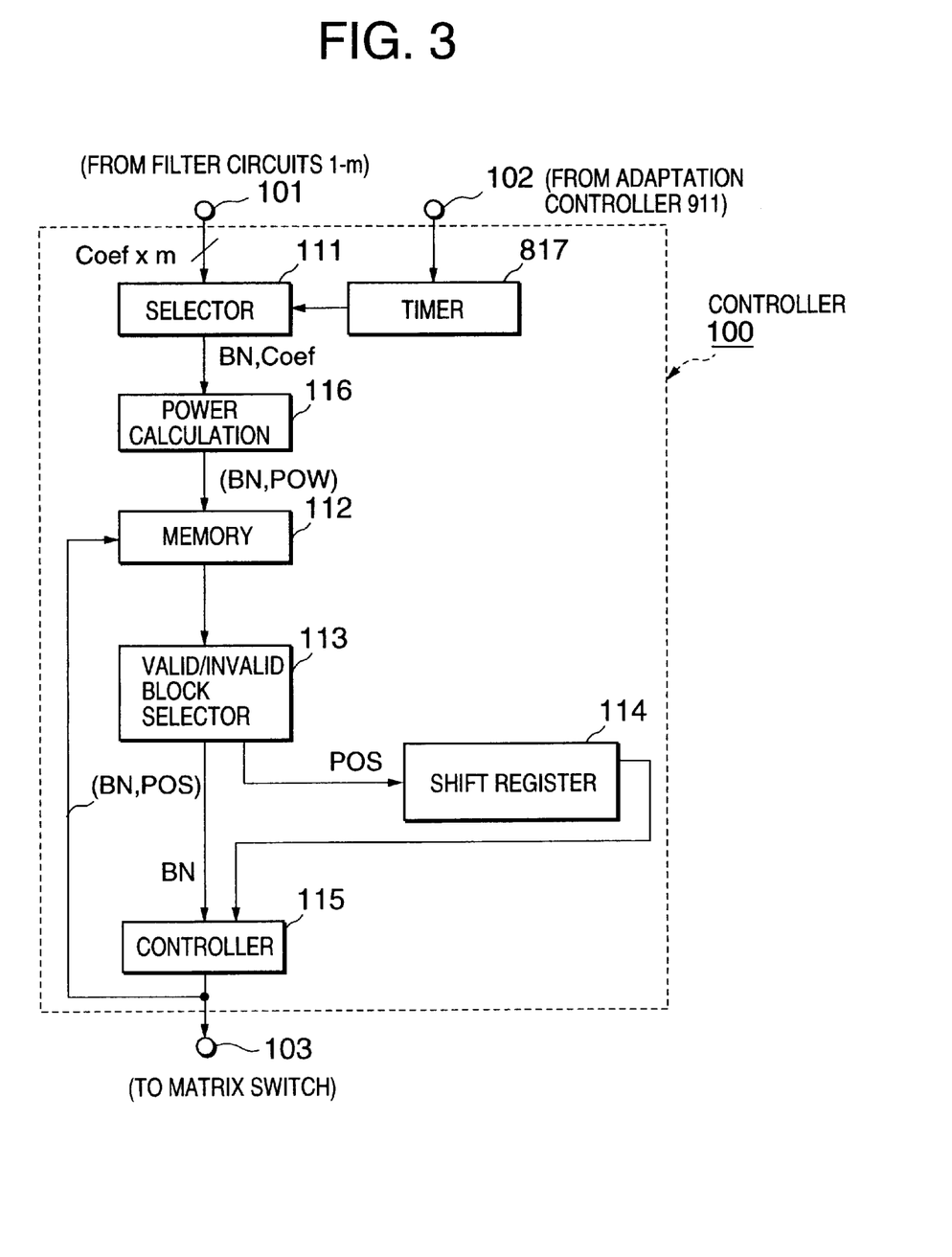
FIG. 3 is a block diagram showing the functional configuration of a controller in an adaptive filter according to an embodiment of the present invention.

An adaptive filter according to an embodiment of the present invention is suitable for an estimator for unknown system for use in an echo canceller as shown in FIG. 1 and especially provides a novel control method and functional configuration thereof. The controller 906 in the conventional adaptive filter is replaced with a novel controller 100 as shown in FIG. 3. The details of the controller 100 will be described hereafter.

Referring to FIG. 3, the controller 100 has input terminals 101 and 102 and an output terminal 103. The input terminal 101 is connected to the filter circuits 1 to m (910.1 to 910.m) to input m coefficients. The input terminal 102 is connected to the adaptation controller 911. The controller 100 includes the following functional blocks: coefficient selector 111, memory 112, valid/invalid block selector 113, shift register 114, controller 115, power calculator 116, and timer 117.

The coefficient select or 111 sequentially selects a block of filter coefficients from m blocks of filter coefficients (Coefxm) input from respective ones of the filter circuits 1–m depending on timing provided by the timer 117, which is further controlled by the adaptation controller 911. The block number BN indicative of a corresponding filter circuit and the filter coefficients Coef of the corresponding filter circuit are output to the power calculator 116. The power calculator 116 calculates the sure of power from the filter coefficients Coef of the selected block.

The calculated coefficient power POW and its block number BN are stored into the memory 112. The memory 112 also stores position information POS indicative of a signal block xi(t) connected to each filter circuit (block number), which is also connection information of the matrix switch 905 connecting m selected signal blocks to respective ones of the m filter circuits 1 to m. As described later, combinations of position information POS indicative of a signal block and block number BN indicative of a filter circuit are updated depending on connection information produced by the controller 115.

The valid/invalid block selector 113 selects one as a to-be-invalid block from valid blocks based on position information POS, block number BN, and coefficient power POW received from the memory 112. The position information POS of the block selected as an invalid one is stored into the shift register 114 so as to append it to the queue. At the same time, the shift register 114 shifts the stored position information by one step to output the head position information of an invalid block to the controller 115. In this embodiment, the matrix switch 905 selects m signal blocks from n signal blocks (m<n) and connects the m signal blocks to the m filter circuits 1 to m. Here, the shift register 114 has n–m stages.

The block number BN of a filter circuit that was connected to the valid block selected by the valid/invalid block selector 113 and the position information output from the shift register 114 are supplied to the controller 115, which generates control data instructing the matrix switch 905 to select its interconnection state.

It should be noted that the controller 100 is provided with a program-controlled processor such as a CPU (not shown), that controls the above-described components so as to adapt the filter coefficients to the unknown system.

Valid/invalid Block Selector

Figure 4:
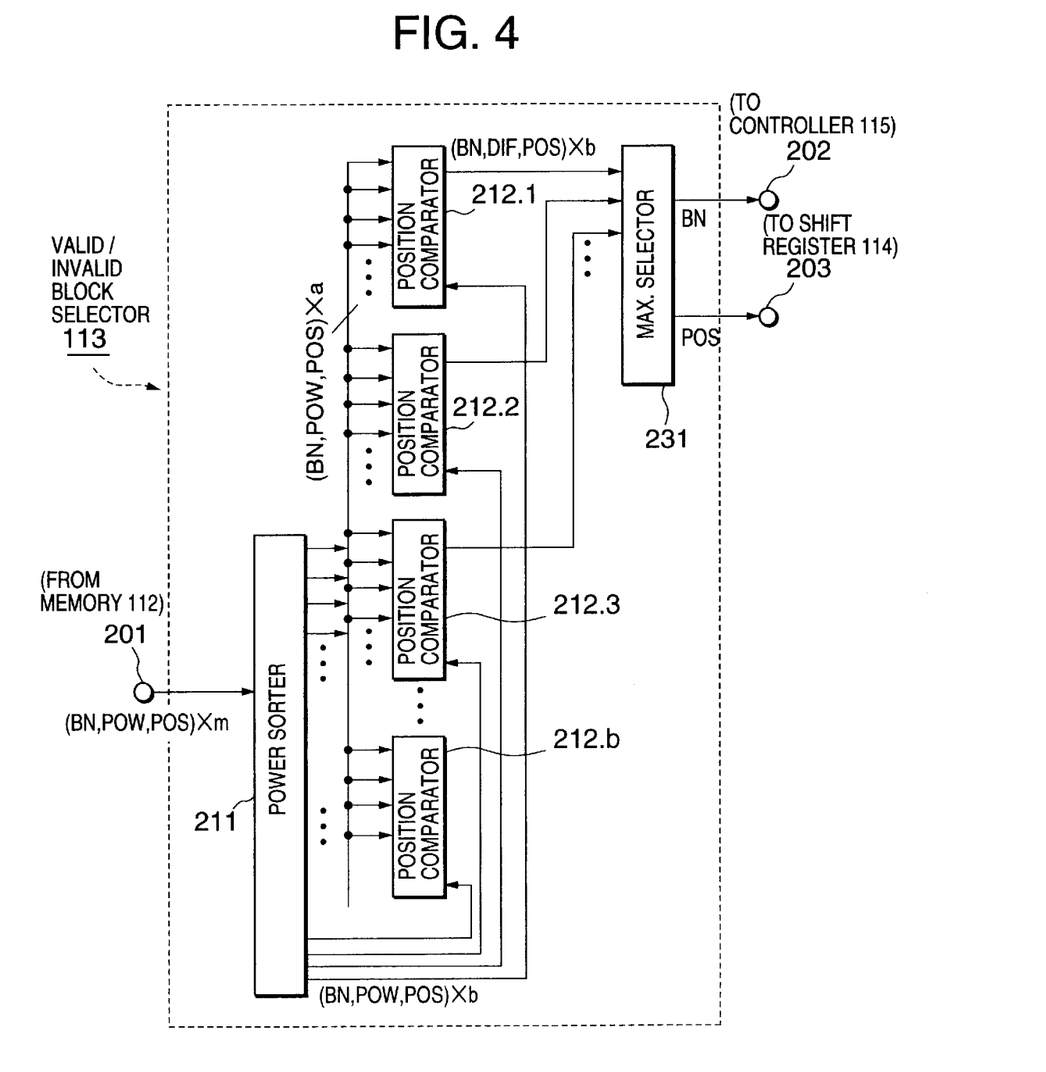
FIG. 4 is a block diagram showing the functional configuration of a valid/invalid block selector in the adaptive filter according to the embodiment.

Referring to FIG. 4, the valid/invalid block selector 113 is provided with a power sorter 211, which sorts combinations of position information POS, block number BN, and calculated coefficient power POW in order of descending calculated coefficient power POW. The a sets of BN, POS, and POW having a greater magnitude of power in the m sorted combinations are output to each of b position comparators 212.1 to 212.b. The b sets of BN, POS, and POW having a smaller magnitude of power in the m sorted combinations are output to respective ones of the b position comparators 212.1 to 212.b, where m>a+b.

Each of the position comparators 212.1 to 212.b compares respective ones of the a positions of the a sets with the position of a corresponding one of the b sets to produce a position differences. Then, among the a position differences, one combination of BN and POS having the minimum difference in position is selected and output to a maximum selector 231. In other words, each of the position comparators 212.1 to 212.b determines a position relationship between the a sets of relatively great power and a corresponding one of the b sets of relatively small power. The details will be described later.

The maximum selector 231 selects one output having the maximum position difference from the outputs of the position comparators 212.1 to 212.b and outputs position information POS of the block changed from valid to invalid to the shift register 114 . In this manner, the processing of Selection 1 is performed. Further, the maximum selector 231 outputs the block number BN of the filter circuit corresponding to the selected block to the controller 115. The controller 115 also inputs tho position information from the shift register 114. In this manner, the processing of Selection 2 is performed.

Position Comparator

Figure 5:
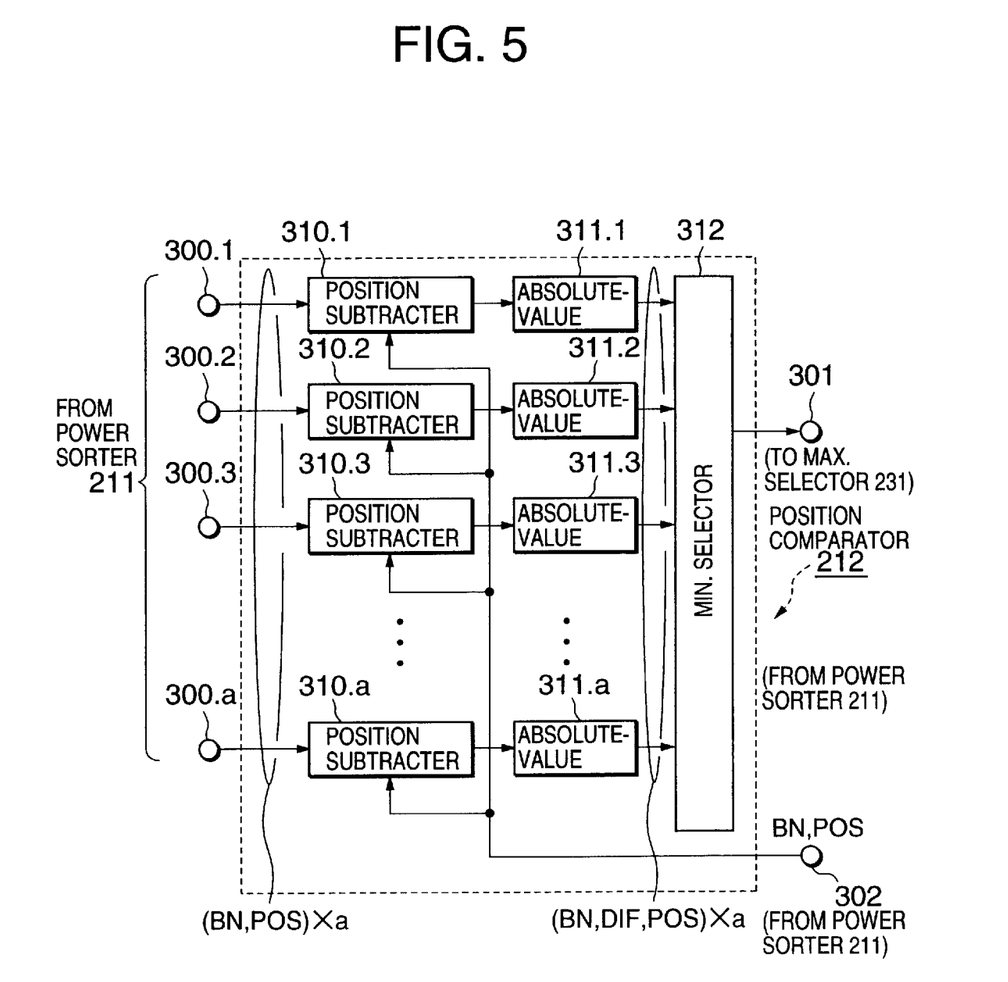
FIG. 5 is a block diagram showing the functional configuration of a position comparator in the valid/invalid block selector of FIG. 4.

Referring to FIG. 5, each of the position comparators 212.1 to 212.b includes a position subtracters 310.1 to 310.a, a absolute-value calculators 311.1 to 311.a, and a minimum selector 312. The position subtracters 310.1 to 310.a subtract respective ones of a positions of the a sets received from the power sorter 211 from the position of a corresponding one of the b sets. The absolute-value calculators 311.1 to 311.a calculate absolute values of the outputs of the position subtracters 310.1 to 310.a and outputs a position differences to the minimum selector 312.

The minimum selector 312 selects one having the minimum position difference among the a position differences and outputs the result as position relationship information to the maximum, selector 231.

OPERATION

In the above-described circuit configuration, the controller 100 controls the matrix switch 905 to connect one of the input signal blocks as a valid block to an appropriate one of the filter circuits 910.1 to 910.m.

In FIG. 3, the coefficient selector 111 selects a block of filter coefficients from m blocks of filter coefficients (Coefx m) input from the filter circuits 910.1 to 910.m depending on timing provided by the timer 117, which is activated only when the estimation is started under control of the adaptation controller 911.

The power calculator 116 calculates the sum of power from the selected block of filter coefficients Coef and the calculated coefficient power POW and the block number BN are stored into the memory 112. The memory 112 also stores position information POS corresponding to each signal block currently connected to the filter circuits, which is also connection information of the matrix switch 905. Combinations of position information POS and block number BN are updated depending on valid/invalid block switching control of the controller 115.

The valid/invalid block selector 113 selects one from valid blocks based on position Information POS, block number BN, and coefficient power POW stored in the memory 112. The position information POS of a block selected as an invalid one from the valid blocks is stored into the shift register 114 so as to append it to the queue. This is the processing of the Selection 1.

The shift register 114 shifts the stored position information by one step to output the head position information as a valid block to the controller 115. The block number BN of a filter circuit that has been connected to the block selected as an invalid one and the position information of a block selected as a valid one are supplied to the controller 115, which generates control data instructing the matrix switch 905 to select its interconnection state. This is the processing of the Selection 2. The new connection information of the matrix switch 905 updates the contents of the memory 112.

As described above, the valid/invalid block selector 113 performs the processing of Selection 1 using position information POS and coefficient power POW. The processing of Selection 2 is performed using just a queue of the shift register 114 having no closed loop.

In FIG. 4, the power sorter 211 sorts position information POSs currently corresponding to respective ones of m block numbers BNs in order of descending coefficient power POW. A predetermined number a of positions having a greater magnitude of power in the m sorted position information are output to each of the b position comparators 212.1 to 212.b. a predetermined number b of positions having a smaller magnitude of power in the m sorted position information are output to respective ones of the b position comparators 212.1 to 212.b, where m>a+b.

Each of the position comparators 212.1 to 212.b compares respective ones of the a positions with the position of a corresponding one of the b positions to produce a position differences. Then, among the a position differences, one position having the minimum difference in position is selected and output to the maximum selector 231. In other words, each of the position comparators 212.1 to 212.b estimates a position relationship between the a positions for relatively great power and a corresponding one of the b positions for relatively small power.

The maximum selector 231 selects one output having the maximum position difference from the outputs of the position comparators 212.1 to 212.b and outputs its block number BN and position information POS as an invalid block to the controller 115 and the shift register 114, respectively. In other words, among the b blocks for relatively small power, one having the maximum position difference from the a positions for relatively great power is estimated as an invalid block to perform the processing of Selection 1.

Since the tap positions for relatively great power is not needed to be located at a single region, the adaptive filter can correctly cope with the case of a plurality of dispersive regions as shown in FIG. 7.

Another Example of Position Comparator

Figure 6:
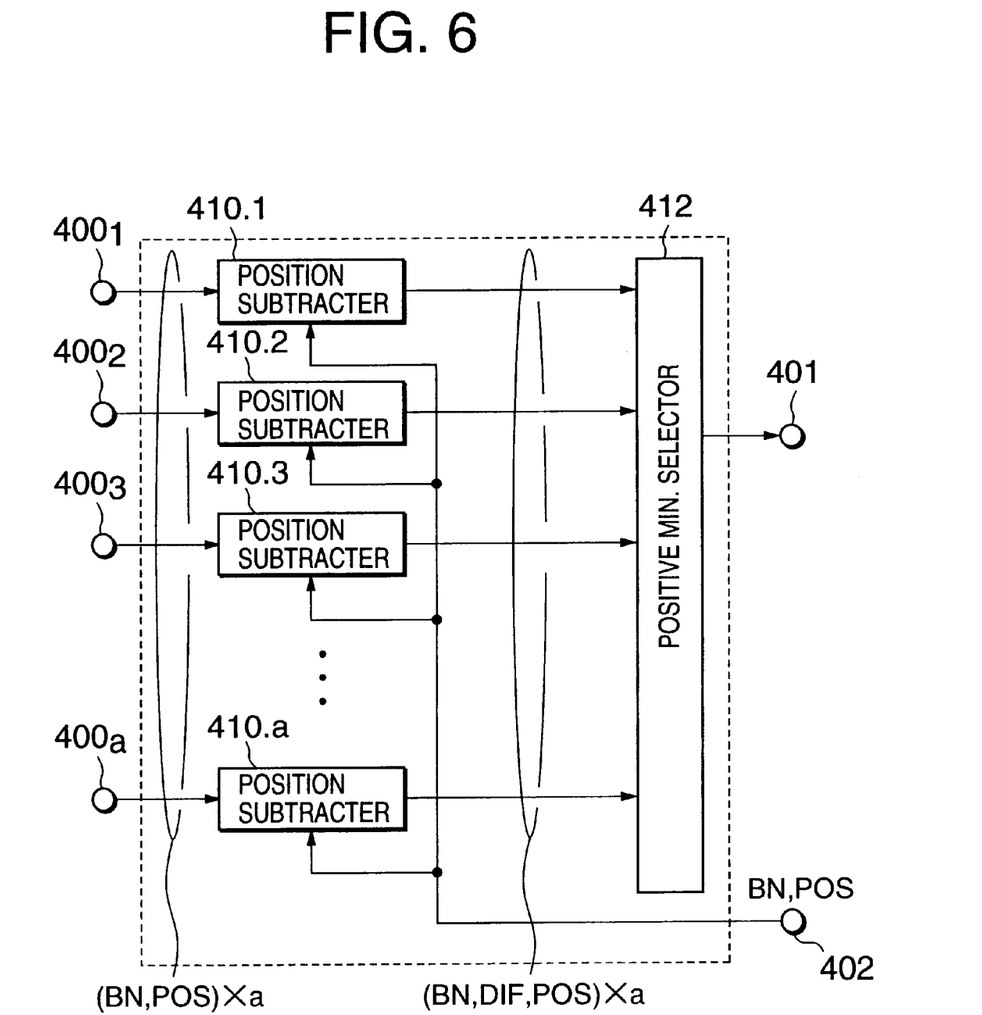
FIG. 6 is a block diagram showing another example of the position comparator in the valid/invalid block selector of FIG. 4.

Referring to FIG. 6, each of the position comparators 212.1 to 212.b may be designed such that a position subtracters 410.1 to 410.a are connected directly to a positive minimum selector 412 that selects one of only positive inputs. The position subtracters 410.1 to 410.a subtract respective ones of a positions of the a sets received from the power sorter 211 from the position of a corresponding one of the b sets. Positive or negative a position differences are output to the positive minimum selector 412. The negative a position differences are not selected by the positive minimum selector 412. The positive minimum selector 412 selects one having the minimum position difference among the positive a position differences and outputs the result as position relationship information to the maximum, selector 231.

In position comparators as shown in FIGS. 5 and 6, negative position differences are eliminated from position comparison. This means that position comparison is performed in a predetermined direction.

More specifically, in the case of estimation of impulse response property as shown in FIG. 7, a block having the maximum power is always located at the left side of a dispersive region. This means that a position difference generated in the right direction from a block having relatively great power in FIG. 7 is important and contrarily a position difference generated in the left direction is not so important. Therefore, among blocks having relatively small power, one having greater position difference in the right direction should be selected as an invalid block.

As described above, according to the present invention, selection of an invalid tap (block) from valid taps (blocks) is performed based on power information and position information. In addition, selection of a valid tap (block) from invalid taps (blocks) is performed using a queue in the shift register without any closed loop. Therefore, all regions can be equally given a chance of estimation, ensuring smooth and stable adaptation to a sudden and great change in a system to be estimated without the need of initial position estimation.

Further, since selection of an invalid tap (block) from valid taps (blocks) is performed taking into consideration power information and position information, stable and rapid convergence can be ensured even in the case of strongly correlative signal such as voice signal. More specifically, among blocks having relatively small power, one more distant from a block having relatively great power is selected Therefore, it is possible to avoid erroneous decision on which should be selected as an invalid one even in the case of a voice signal causing unstable update of filter coefficients. This results in increased convergence rate in the case of a voice signal.

Furthermore, since position comparison is performed between a plurality of (a) blocks having relatively great power and a plurality of (b) blocks having relatively small power, a plurality of dispersive regions can be estimated unless the number of dispersive regions exceeds the number (a) of blocks having relatively great power and the dispersive regions are extremely dispersed.

What is claimed is:

1. An adaptive filter comprising:

N signal blocks obtained by dividing a serial input signal by K, wherein N, K is an integer greater than 1;

M (M<N) filter circuits, each of which generates K filter coefficients for one of the N signal blocks;

a switch for connecting M signal blocks selected from the N signal blocks to respective ones of the M filter circuits; and a controller controlling interconnection of the switch based on the K filter coefficients generated by each of the M filter circuits, wherein the controller comprises:

a memory for storing position information indicative of a signal block connected to each of the M filter circuits, power information obtained from the K filter coefficients generated by each of the M filter circuits;

a selector for selecting one as an invalid block from the M signal blocks connected to the M filter circuits to determine position information indicative of a selected signal block as an invalid block and a corresponding filter circuit that has been connected to the selected signal block;

a shift register for storing a queue of position information, wherein the position information indicative of the selected signal block is appended to the queue and position information is output from a head of the queue; and a switch controller controlling the switch using the corresponding filter circuit determined by the selector and the position information received from the shift register.

2. The adaptive filter according to claim 1, wherein the selector selects one as an invalid block from the M signal blocks connected to the M filter circuits position by selecting a plurality of first signal blocks having relatively great power and a plurality of second signal blocks having relatively small power, wherein one of the second signal blocks, which is most distant from the first signal blocks, is selected as the invalid block.

3. The adaptive filter according to claim 2, wherein the selector comprises:

a power sorter for sorting position information currently corresponding to respective ones of the M filter circuits in order of descending power information;

a position comparator for comparing position information of the first signal blocks having higher-order power with that of each of the second signal blocks having lower-order power to produce minimum position differences for respective ones of the second signal blocks; and a maximum selector for selecting a maximum one of the minimum position differences to determine the position information indicative of a selected signal block as an invalid block and a corresponding filter circuit that has been connected to the selected signal block.

4. The adaptive filter according to claim 3, wherein the position comparator comprises:

a position subtracter provided for position information of each of the first signal blocks, for calculating a position difference between a corresponding first signal block and a corresponding second signal block; and a minimum selector for selecting a minimum position difference from absolute values or position differences calculated for respective ones of the first signal blocks.

5. The adaptive filter according to claim 3, wherein the position comparator comprises:

a position subtracter provided for position, information of each of the first signal blocks, for calculating a position difference between a corresponding first signal block and a corresponding second signal block; and a positive minimum, selector for selecting a minimum position difference from positive ones of position differences calculated for respective ones of the first signal blocks.

6. A control method for an adaptive filter comprising:

N signal blocks obtained by dividing a serial input signal by K, wherein N, K is an integer greater than 1;

M (M<N) filter circuits, each of which generates K filter coefficients for one of the N signal blocks; and a switch for connecting M signal blocks selected from the N signal blocks to respective ones of the M filter circuits, the method comprising the steps of:

a) storing position information indicative of a signal block connected to each of the M filter circuits, power information obtained from the K filter coefficients generated by each of the M filter circuits;

b) selecting one as an invalid block from the M signal blocks connected to the M filter circuits to determine position information indicative of a selected signal block as an invalid block and a corresponding filter circuit that has been connected to the selected signal block;

c) storing a queue of position information, wherein the position information indicative of the selected signal block is appended to the queue and position information is output from a head of the queue; and d) controlling interconnection of the switch using the corresponding filter circuit determined by the selector and the position information received from the shift register.

7. The method according to claim 6, wherein the step (b) comprises the steps of:

b.1) selecting a plurality of first signal blocks having relatively great power and a plurality of second signal blocks having relatively small power;

b.2) determining which one of the second signal blocks is most distant from the first signal blocks; and b.3) selecting a determined one of the second signal blocks as an invalid block.

8. The method according to claim 6, wherein the step (b) comprises the steps of:

b.1) sorting position information currently corresponding to respective ones of the M filter circuits in order of descending power information;

b.2) comparing position information of the first signal blocks having higher-order power with that of each of the second signal blocks having lower-order power to produce minimum position differences for respective ones of the second signal blocks; and b.3) selecting a maximum one, of the minimum position differences to determine the position information indicative of a selected signal block as an invalid block and a corresponding filter circuit that has been connected to the selected signal bock.

9. The method according to claim 8, wherein the step (b.2) comprises the steps of:

calculating a position difference between a corresponding first signal block and a corresponding second signal block; and selecting a minimum position difference from absolute values of position differences calculated for respective ones of the first signal blocks.

10. The method according to claim 8, wherein the step (b.2) comprises the steps of:

calculating a position difference between a corresponding first signal block and a corresponding second signal block; and selecting a minimum position difference from positive ones of position differences calculated for respective ones of the first signal blocks.

11. An echo canceller comprising:

an unknown system to be estimated;

an adaptive filter for adapting to the unknown system by adjusting filter coefficients; and a adaptation controller controlling the adaptive filter based on an input signal, an echo signal, and a residual signal obtained by subtracting the echo signal from an output of the adaptive filter, wherein the adaptive filter comprises:

N signal blocks obtained by dividing the input signal by K, wherein N, K is an integer greater than 1;

M (M<N) filter circuits, each of which generates K filter coefficients for one of the N signal blocks;

a switch for connecting M signal blocks selected from the N signal blocks to respective ones of the M filter circuits; and a controller controlling interconnection of the switch based on the K filter coefficients generated by each of the M filter circuits, wherein the controller comprises:

a memory for storing position information indicative of a signal block connected to each of the M filter circuits, power information obtained from the K filter coefficients generated by each of the M filter circuits;

a selector for selecting one as an invalid block from the M signal blocks connected to the M filter circuits to determine position information indicative of a selected signal block as an invalid block and a corresponding filter circuit that has been connected to the selected signal block;

a shift register for storing a queue of position information, wherein the position information indicative of the selected signal block is appended to the queue and position information is output from a head of the queue; and a switch controller controlling the switch using the corresponding filter circuit determined by the selector and the position information received from the shift register.

12. The echo canceller according to claim 11, wherein the selector selects one as an invalid block from the M signal blocks connected to the M filter circuits position by selecting a plurality of first signal blocks having relatively great power and a plurality of second signal blocks having relatively small power, wherein one of the second signal blocks, which is most distant from the first signal blocks, is selected as the invalid block.

13. The echo canceller according to claim 12, wherein the selector comprises:

a power sorter for sorting position information currently corresponding to respective ones of the M filter circuits in order of descending power information;

a position comparator for comparing position information of the first signal blocks having higher-order power with that of each of the second signal blocks having lower-order power to produce minimum position differences for respective ones of the second signal blocks; and a maximum selector for selecting a maximum one of the minimum position differences to determine the position information indicative of a selected signal block as an invalid block and a corresponding filter circuit that has been connected to the selected signal block.

14. The echo canceller according to claim 13, wherein the position comparator comprises:

a position subtracter provided for position information of each of the first signal blocks, for calculating a position difference between a corresponding first signal block and a corresponding second signal block; and a minimum selector for selecting a minimum position difference from absolute values of position differences calculated for respective ones of the first signal blocks.

15. The echo canceller according to claim 13, wherein the position comparator comprises:

a position subtracter provided for position information of each of the first signal blocks, for calculating a position difference between a corresponding first signal block and a corresponding second signal block; and a positive minimum selector for selecting a minimum position difference from positive ones of position differences calculated for respective ones of the first signal blocks.

* * * * *